US011513910B2

(12) United States Patent
Natanzon et al.

(10) Patent No.: US 11,513,910 B2
(45) Date of Patent: Nov. 29, 2022

(54) COMPLIANCE AS A SERVICE FOR MULTI-CLOUD BACKUP SYSTEMS

(71) Applicant: EMC IP Holding Company LLC, Hopkinton, MA (US)

(72) Inventors: Assaf Natanzon, Tel Aviv (IL); Yossef Saad, Ganei Tikva (IL)

(73) Assignee: EMC IP Holding Company LLC, Hopkinton, MA (US)

(*) Notice: Subject to any disclaimer, the term of this patent is extended or adjusted under 35 U.S.C. 154(b) by 847 days.

(21) Appl. No.: 15/963,826

(22) Filed: Apr. 26, 2018

(65) Prior Publication Data
US 2019/0332494 A1 Oct. 31, 2019

(51) Int. Cl.
G06F 11/14 (2006.01)
G06F 9/54 (2006.01)

(52) U.S. Cl.
CPC .......... *G06F 11/1464* (2013.01); *G06F 9/54* (2013.01); *G06F 11/1448* (2013.01); *G06F 11/1469* (2013.01)

(58) Field of Classification Search
CPC ............. G06F 11/1164; G06F 11/1448; G06F 11/1469; G06F 9/54
See application file for complete search history.

(56) References Cited

U.S. PATENT DOCUMENTS

| 8,458,422 B1* | 6/2013 | Holdman | G06F 11/1479 |
| | | | 711/E12.001 |
| 9,967,285 B1* | 5/2018 | Rossman | G06F 16/22 |
| 10,484,429 B1* | 11/2019 | Fawcett | H04L 63/20 |
| 2003/0097533 A1* | 5/2003 | Maeda | G06F 11/1466 |
| | | | 714/E11.122 |
| 2011/0246732 A1* | 10/2011 | Amano | G06F 11/1456 |
| | | | 711/E12.103 |
| 2015/0350249 A1* | 12/2015 | Reno | H04L 63/1433 |
| | | | 726/1 |
| 2016/0088021 A1* | 3/2016 | Jayanti Venkata | H04L 63/08 |
| | | | 726/1 |
| 2016/0337473 A1* | 11/2016 | Rao | H04L 41/5051 |
| 2017/0010941 A1* | 1/2017 | Shimada | G06F 11/00 |
| 2017/0041206 A1* | 2/2017 | Maes | H04L 41/5009 |
| 2017/0235909 A1* | 8/2017 | Lozano | G06F 19/3418 |
| | | | 705/3 |
| 2017/0279890 A1* | 9/2017 | Borlick | H04L 67/1097 |
| 2018/0225605 A1* | 8/2018 | Fabara | G06Q 10/0635 |
| 2019/0058640 A1* | 2/2019 | Bildhauer | H04L 41/5032 |
| 2019/0286839 A1* | 9/2019 | Mutha | G06F 16/29 |

* cited by examiner

*Primary Examiner* — Alford W Kindred
*Assistant Examiner* — Tiffany Thuy Bui
(74) *Attorney, Agent, or Firm* — Staniford Tomita LLP

(57) ABSTRACT

Embodiments of a compliance service that will enable users be compliant with all regulatory, industry processes and business needs at all times. The service is available to storage and data protection systems through a set of APIs that will enable such compliance be achieved and maintained with no user intervention and without labor-intensive manual work. The service will also allow storing the configuration of the data protection policies and create alerts when compliance changes. A data backup platform may include a data protection system that integrates with such a service and provides full regulatory/industry compliance.

17 Claims, 7 Drawing Sheets

US 11,513,910 B2

COMPLIANCE AS A SERVICE FOR MULTI-CLOUD BACKUP SYSTEMS

TECHNICAL FIELD

Embodiments are generally directed to large-scale enterprise networks, and more specifically to a regulatory compliance system and method for cloud-based data centers.

BACKGROUND

Storage systems and data protection systems store user data in various formats. However, the storage of user data is often governed by various requirements such as regulatory requirements set by governments (e.g., security or privacy laws), control processes by organizations (e.g., SEC, FDA, etc.) and specific requirements set by various other organizations (generally referred to herein as "regulatory requirements"). Such requirements can be hard to manage as they differ between industries and verticals, are different in each country/state, and continuously change over time.

For example, medical records are required to be retained for a long time (e.g., up to 35 years in some countries); they are also subject to privacy and access restrictions defined by government and/or industry regulations, such as HIPAA (Health Insurance Portability and Accountability Act) in the United States, and similar requirements in other countries. For example, in the legal field, law firms typically do not want specific data (such as e-mails) to be retained for more than a relatively short period of time (e.g., one week) due to unwanted disclosure of information. Instead of permanent storage, such organizations might prefer a different rule to be imposed (e.g., delete all copies of a certain data type after a short period of time, or retain all data indefinitely). The storage system itself cannot determine how long to keep the data and is dependent on the user/operator to set appropriate policies and specify the retention policy and access level for each data type. In some industries, there are rules generated by the specific users or organizations that operate in the space.

In some cases, the location of the data affects the requirement for retention and access. For example, the European Union (EU) does not allow data of EU citizens/companies to be stored outside of the EU, as required under the General Data Protection Regulation (GDPR). A storage/data-protection system serving the EU should thus ensure that all copies are stored on servers that located in accordance with such regulation, and not just "somewhere in the cloud." Another example would be the use of the public cloud to store data copies, whereas customers may opt to keep only encrypted data (or only partial data) in the public cloud, for security reasons.

Any storage, data protection, or data management system should thus follow any and all applicable regulatory requirements to ensure that data is stored according to a policy that accommodates not only the users' business need, but also the relevant control guidelines applicable to such data. Unfortunately, the complexity of such regulatory environments prevents many users from properly defining the right policies. Moreover, the variety and constant change of such requirements prevents vendors from incorporating them into their solutions. The problem is even more complex when using cloud platforms for data backup and recovery applications, as the exact placement of the data and limitations on the cloud provider can cause even more regulatory issues.

As data centers are moving to become multi-cloud solutions, enforcing the compliance rules becomes even more complicated. Data copies can be stored in multiple clouds, and understanding if a specific cloud answers specific regulatory rules is even more difficult, as cloud data centers may be move, or new data centers may emerge, For example, a large e-commerce company may create a new data center in Germany allowing German companies to keep data inside their site even if the data must stay in Germany; or it may merge to data centers in a single county. This operation may be seamless to the user but it may require changes in data placement as regulatory rules may be violated. In this example scenario, there may be certain tools available for GDPR compliance (e.g., Microsoft trust center), however such tools use complex algorithms to detect whether a data set contains data which is regulated by the GDPR. When the backup software backs up to a cloud, the GDPR search engine does not necessarily understand that there is potentially sensitive data in the cloud. This data that can also be encrypted and not searchable, and such data can be stored in the wrong cloud. Such storage in this location may not be allowed by regulation, even if the data is encrypted. As can be appreciated, the migration and processing of data among different jurisdictions (countries, organizations, data centers, etc.) may raise compliance issues in strict regulatory environments and scenarios, What is needed, therefore is a system that ensures customer compliance with all related regulations and control guidelines in distributed data center contexts.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
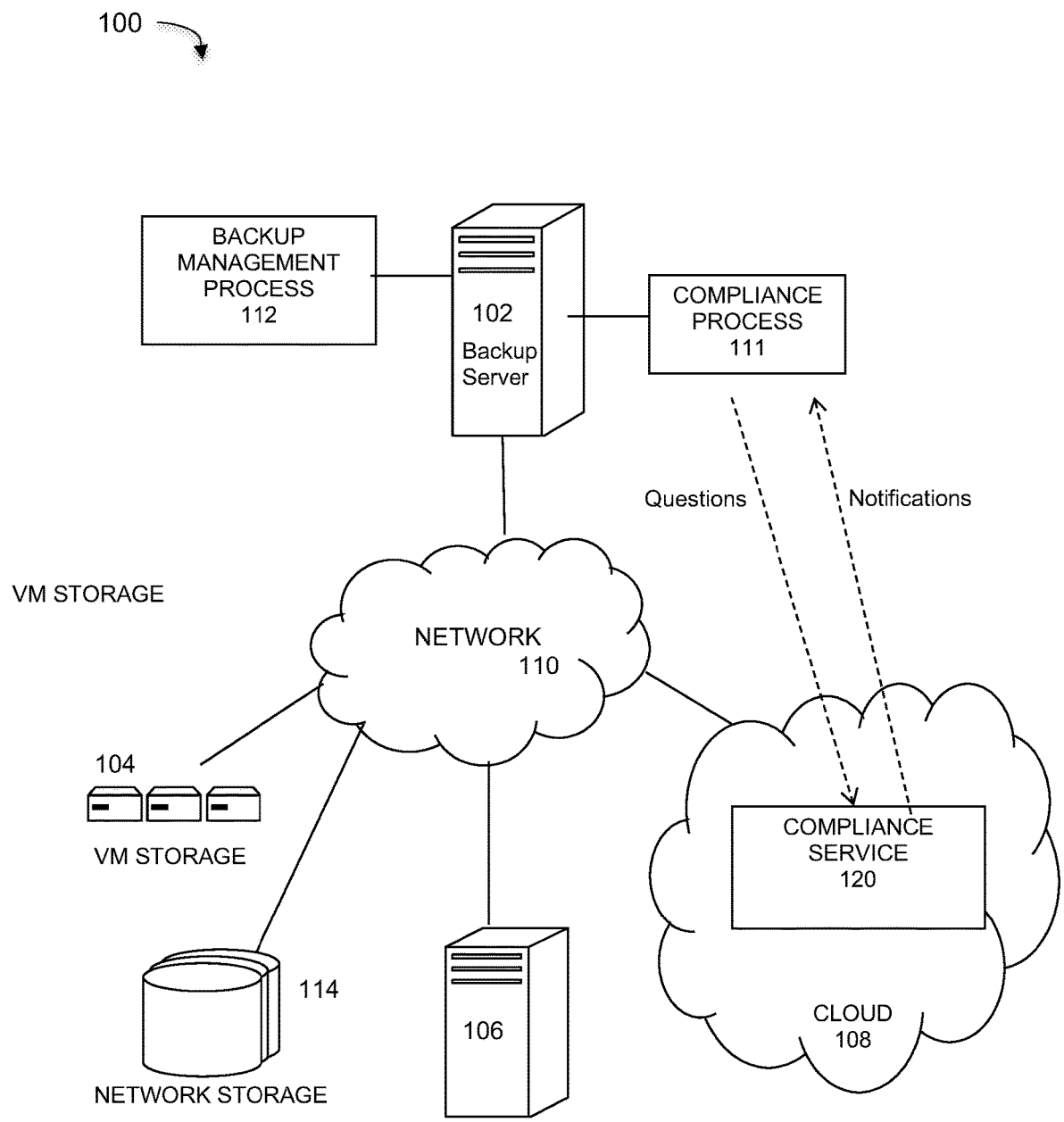
FIG. 1 illustrates a computer network that implements a compliance service process for backup systems, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Disclosed herein are methods and systems of providing regulatory requirement compliance as a service for cloud-computing platforms and enterprise-scale backup systems. FIG. 1 illustrates a computer network that uses a compliance service for backup applications, under some embodiments. System 100 comprises a large-scale network that includes a number of different devices, such as server or client computers 102, networked appliances 106, storage devices 114, and other similar devices or computing resources. Other networks may be included in system 100 including local area network (LAN) or cloud networks 108 and virtual machine (VM) storage 104 or VM clusters. These devices and network resources may be connected to a central network, such as a central or cloud computing network 110 that itself contains a number of different computing resources (e.g., computers, interface devices, and so on). FIG. 1 is intended to be an example of a representative system implementing a compliance as a service platform under some embodiments, and many other topographies and combinations of network elements are also possible.

For the example network environment 100 of FIG. 1, server 102 is a backup server that executes a backup management process 112 that coordinates or manages the backup of data from one or more data sources, such as other servers/clients to storage devices, such as network storage 114 and/or virtual storage devices 104, or other data centers. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs, and to the data sources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source (e.g., server or network appliance 106) may be any appropriate data, such as database data that is part of a database management system within a data center comprising a server 106 and other clients, and the data may reside on one or more hard drives (e.g., 114) for the database(s) in a variety of formats.

As stated above, the data generated or sourced by system 100 and transmitted over network 110 may be stored in any number of persistent storage locations and devices, such as local client storage, server storage, or other network storage.

In a particular example embodiment, system 100 may include a backup server running Networker or Avamar data protection software backing up to Data Domain protection storage, such as provided by Dell/EMC™ Corporation. However, other similar backup and storage systems are also possible.

Although embodiments are described and illustrated with respect to certain example implementations, platforms, and applications, it should be noted that embodiments are not so limited, and any appropriate network supporting or executing any application may utilize aspects of the backup management and compliance processes described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

As stated above, storage systems and data protection systems store user data in various formats, and the storage of such data may be governed by various governmental or industry requirements such as regulatory requirements that restrict access and impose certain minimum security requirements on the processing and/or storage of the data. In an embodiment, server 102 accesses a cloud-based compliance process 120 that allows system users to access guidelines and policies that ensure that user data is stored according to policies that meet business needs and also conform to the relevant regulatory requirements applicable to such data. This platform allows users to properly define the right policies and allows vendors to incorporate them into their backup products and solutions.

For the embodiment of FIG. 1, the compliance service 120 is resident in cloud network 108 and provided as a cloud-based service or as part of a cloud platform. The compliance service 120 addresses regulatory questions and requirements of the backup process 112, and other possible server 102 processes, and runs checks using the compliance platform of cloud 108. The regulatory questions may be asked by the user of the data processing application (e.g., backup process 112) in the form of plain language questions entered through an appropriate API or command line interface.

In an embodiment, a server-side compliance process 111 may be used to access the compliance service 120 in cloud 108. The compliance process 111 may be a separate server-side process, as shown, or it may be part of the data protection software 112 to consult the compliance service 120. Although embodiments are described with respect to data backup applications (e.g., backup process 112), embodiments are not so limited. Embodiments of a compliance system and process described herein may be used in any data processing application (e.g., migration, compression, encryption, translation, etc.) in large-scale (or even medium/small-scale) enterprise networks that need to implement or conform to defined policies and rules enforced by a compliance server or organization, and such systems may typically, but not necessarily involve cloud-based data centers.

Figure 2:
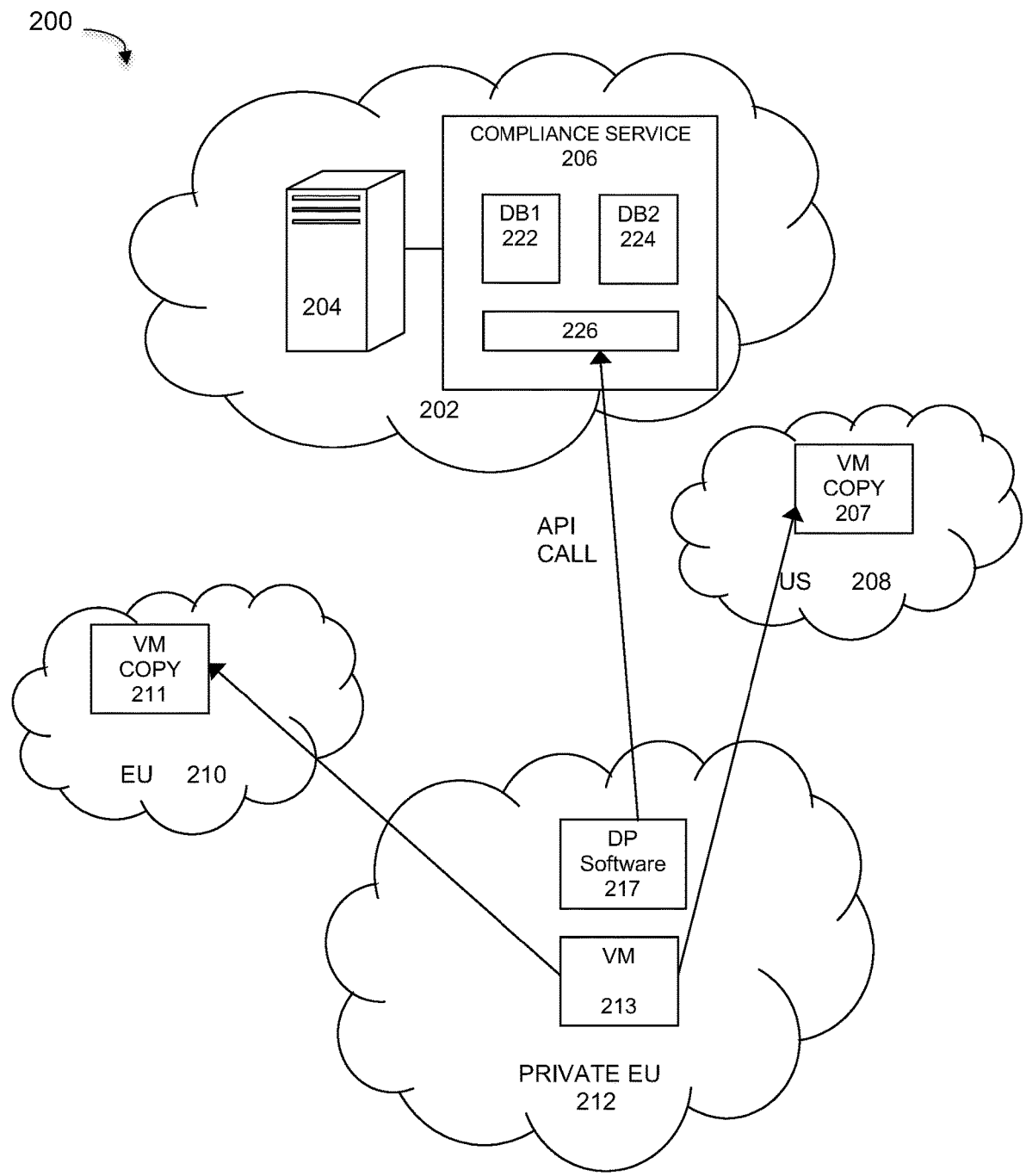
FIG. 2 illustrates implementation of a compliance process in a multi-cloud storage environment under some embodiments.

FIG. 1 illustrates a case of a single customer backup server (system) or data center connected to a cloud-based compliance service, but practical embodiments involve multiple data centers coupled to a central compliance service that addresses compliance questions for all the data centers. FIG. 2 illustrates implementation of a compliance process in a multi-cloud storage environment under some embodiments. FIG. 2 illustrates an example scenario of data centers distributed around the world in a global storage context and is intended to illustrate only one example scenario of a cloud-based compliance service. In the example network 200 of FIG. 2, a VM 213 in a private cloud 212 in the EU needs to store a copy 211 or 207 in another location. The example possible locations are either a cloud 210 (e.g., an IBM™ Bluemix cloud) in the EU 210 or a cloud 208 in the United States (e.g., and Amazon™ Web Services, AWS, cloud). However, because of the GDPR regulations, the VM can only be protected by DP (data protection) software 217 in the EU (Bluemix cloud), in this case. This means that an API call asking if the VM can be protected in the US (AWS) will reply that it is not compliance. In an embodiment, the compliance service 206 executed by a server 204 in network 202 provides such information regarding regulatory compliance and provides notifications to alert the user and may even provide mechanisms or feedback that help ensure such compliance.

The network environment 200 illustrates embodiments that include an SaaS (Software as a Service) computing platform 206 that acts as a central service which will include all the required regulatory guidelines about data retention/storage in multiple countries/industries, and that can be constantly updated by a specialty group of experts. In an enterprise application, this service can be offered through a set of interfaces (e.g., file/e-mail and/or APIs) to users who want to benefit from the knowledge of the team maintaining this service to get all the regulatory requirements applicable to them. The data can be provided to the users manually as a document, e-mail, file, or other transmission, or it can be automatically communicated to storage/data protection software through APIs. The APIs can be published to vendors of storage, data protection and data management systems, such that they can interface with the service, to enable automatic update of their system configuration data as applies for each data entity, thus saving manual work for the user.

As shown in FIG. 2, compliance service 206 includes or accesses a first database (DB1) 222 that containing all the compliance (policy/regulation) rules. This database contains data that allows the compliance service 206 to answer questions such as: how many copies do we need for this data type?, what is the retention period we need?, can we keep this data in Amazon™ in Germany?, and so on. A second database (DB2) 224 contains metadata about backup copies (e.g., VM copies 207 and 211) of tenants. This includes, for each tenant and each data set (like a VM), the data set identity, its type, where are the copies stored, when was the copy created, and other similar information. A tenant can use the compliance service and first database 222 to get answers as to where data should be stored. It can also use the compliance service and second database 224 to get notifications when something changes. The subscribers to the notification service will also get notification from the cloud in the event of any policy or regulatory violation. Such a service may be provided to users in any appropriate manner, such as through a fee-based subscription, user license scheme, or any similar service or product offering.

For the embodiment of FIG. 2, tenant VM 213 connects the cloud service through a compliance process (such as process 111 shown in FIG. 1) that may be part of DP software 217 to connect to the compliance service 206. The compliance service 206 has an API interface 226 that can answer the API calls of the tenants. These calls will typically be compliance questions, such as "can we protect this data type in this location?" and other similar questions. In an embodiment, the format of such interaction is performed using JSON (JavaScript Object Notation) or other similar lightweight data-interchange format.

The challenge solved by the compliance service platform 206 is that when users use storage/DP/DM systems, they are responsible to set the policy for each data entity, such as the frequency of copies, expiration policy, data storage location, number of copies, and so on. They are required to know all the legal and regulatory requirements, as well as industry practices that apply to every type of data entity, and provision their system accordingly. This knowledge is, in many cases, above and beyond the capabilities of the average IT person, or even the business owner. In some companies there may be a "Compliance Officer", but even this person cannot accommodate the growth of data and is only left to set high level guidelines at best.

System vendors seek to incorporate such knowledge into their systems and provide pre-defined policies that apply with some common regulation, however these are typically limited only to the very well-known requirements in the more dominant countries (e.g., SEC and HIPAA in the U.S.), but they do not solve the needs in other countries, or the coverage of state and local regulation even in the United States. Moreover, the ever-changing nature of such regulation does not align with the slow release cycle of storage/DP/DM systems that cannot keep up with such changes and therefore users are becoming non-compliant when their systems are not continuously upgraded to the latest releases.

In an embodiment, the compliance service maintains or accesses a database (e.g., DB1 222) or databases of the relevant regulatory requirements pertaining to data storage, retention, expiration, security, access, and so on. These are stored in a way that will only include the appropriate attributes that apply in the regulation. The service will be constantly available to all cloud provider data centers, and with rules about allowing specific data type stored in a specific cloud. The rules are formatted in any appropriate format for the compliance service and can include rules such as (1) where a type of data can be stored, (2) the expiration time required for a type of data, and so on. The service may also include for each user, a database (e.g., DB2 224) metadata about its copies, where the copies are stored, when they were created, the type of data the copies include, and so on. Using the compliance rules and the metadata from each user the compliance service can notify the user compliance is satisfied or that compliance is violated, in which case, a copy of the data set must be deleted, moved, or some other action taken.

Figure 3:
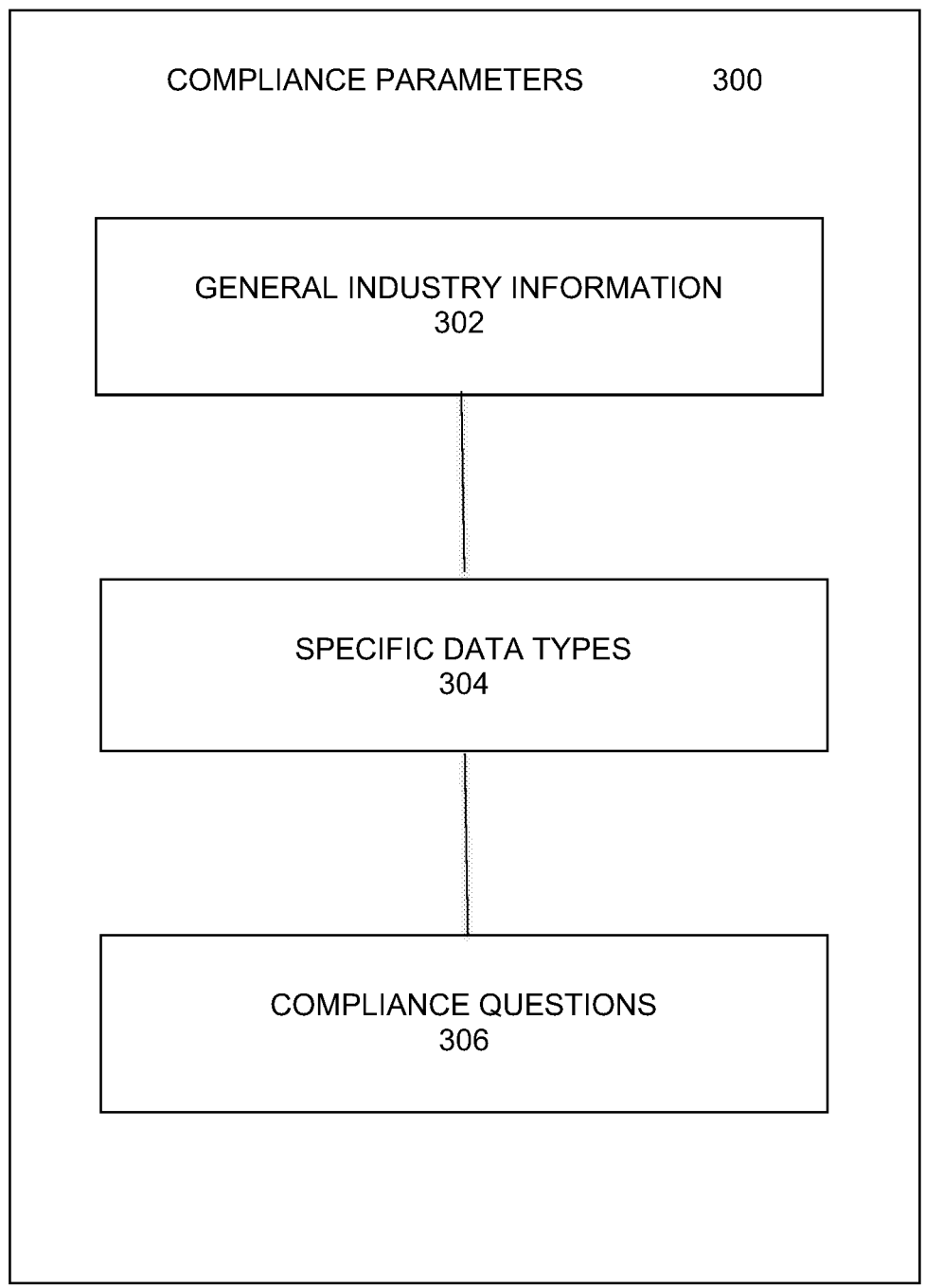
FIG. 3 illustrates the main parameters for the compliance service under some embodiments.

The platform of FIG. 2 may be provided to backup vendors and data protection systems will be able to subscribe to this service, such as by obtaining username/password and providing the payment details. In a multi-tenant fashion, each subscriber will be able to define certain parameters regarding the compliance service. FIG. 3 illustrates three main parameters for the compliance service under some embodiments. As illustrated in FIG. 3, the parameters 300 include general information about the industry 302, specific data types 304, and certain compliance questions 306.

With respect to the general information about their industry, 302, the user is able to specify their location, and select a variety of parameters that would better define their needs, such as: (1) their actual storage/DP/DM systems used (vendor, model, capacity, performance, etc.), (2) how conservative they want to be with respect to data retention (e.g., hourly, daily, weekly, etc.), (3) whether they want to optimize for lower cost or avoiding risk, and other such characteristics.

With respect to the specific data types are involved 304, such data can be defined in each specific industry, and may be similar to tags used in storage/DP/DM systems. Examples of data types include: (1) personal identification data (e.g. names, Social Security numbers etc.); (2) financial Information (e.g. bank account, credit card number, etc.); (3) medical records (e.g. diagnosis, test results, medical images etc.), and so on. In general, the data can be embodied in a standard JSON format, but embodiments are not so limited and any appropriate format for the data can be used.

In an embodiment, an API and a user interface (UI) for the compliance service 206 will allow the user to ask compliance questions 306, such as (but not limited to): (1) what is the recommended policy for data type X?, and (2) can I protect data type Y on cloud Z (e.g.: can we store encrypted credit card information on AWS in the US-East region?), such as for the example network scenario of FIG. 2.

In an embodiment, the API may be implemented as a RESTful API (RESTful web service) that is based on representational state transfer (REST) technology, and that uses HTTP requests to GET, PUT, POST and DELETE data. Two types of APIs may be implemented. The first type of API allows the user to ask about regulatory requirements for specific types of data, such as: can we store the data in a particular cloud?, how long should we store it?, how many copies can we make?, and so on. The compliance service accesses the appropriate database to provide answers to such questions. The second type of API allows the user to notify the compliance service about each data operation and the service can then reactively notify the user about compliance. Such notifications can include: (a) the data must be deleted (due to current or new retention policies for the type of data, (b) the data must be moved to another cloud (due to a specific cloud violating some regulation), (c) more copies of the data should be created (due to new regulations for example), and other similar notifications. This API will let the data protection system notify the user that data of a certain type was stored in a specific cloud, and upon any compliance change, the compliance service will notify the data protection system if there is a compliance violation due to some change. The API will be aware of the protection type, for example data which is kept in a cloud for backup. Different data types may be treated differently. For example, encrypted data is generally not treated the same as data which is used for data recovery, and this type of data may run in a particular cloud whereas encrypted data may run in this cloud.

In an embodiment, the compliance process 111 will be integrated with the functions of data protection and backup software 112. The data system can be integrated with a data detection driver, like a Microsoft compliance center for GDPR or other services for other compliance issues. This will allow data protection systems to understand the type of data which exists so that it can integrate with the regulation service. Every time a new backup or data protection task is configured, the compliance service will be updated, such as with an API call. For example, the API call will notify that a VM which contains medical record is backed up to a Microsoft Azure cloud in Germany, the compliance service may then approve or decline the request.

In an embodiment, the SaaS compliance service is configured to trigger a call to the data protection software when the protection is not compliant anymore. For example, if a workload containing credit card information is no longer allowed in AWS, an event will be triggered and the data protection software will need to change the policy and update the compliance service.

The SaaS compliance service can be configured to be available as a generic cloud service so that any data protection (or other) software program can integrate with the service. The compliance service has a well-defined API format (such as specific JSON format) and any data protection service will be able to call the API for the compliance service. Embodiments of the compliance service can be built as a service that will run in a centralized network location (e.g., on Dell EMC infrastructure or on a public cloud) and update the backup software to work with the compliance service 206.

Figure 4:
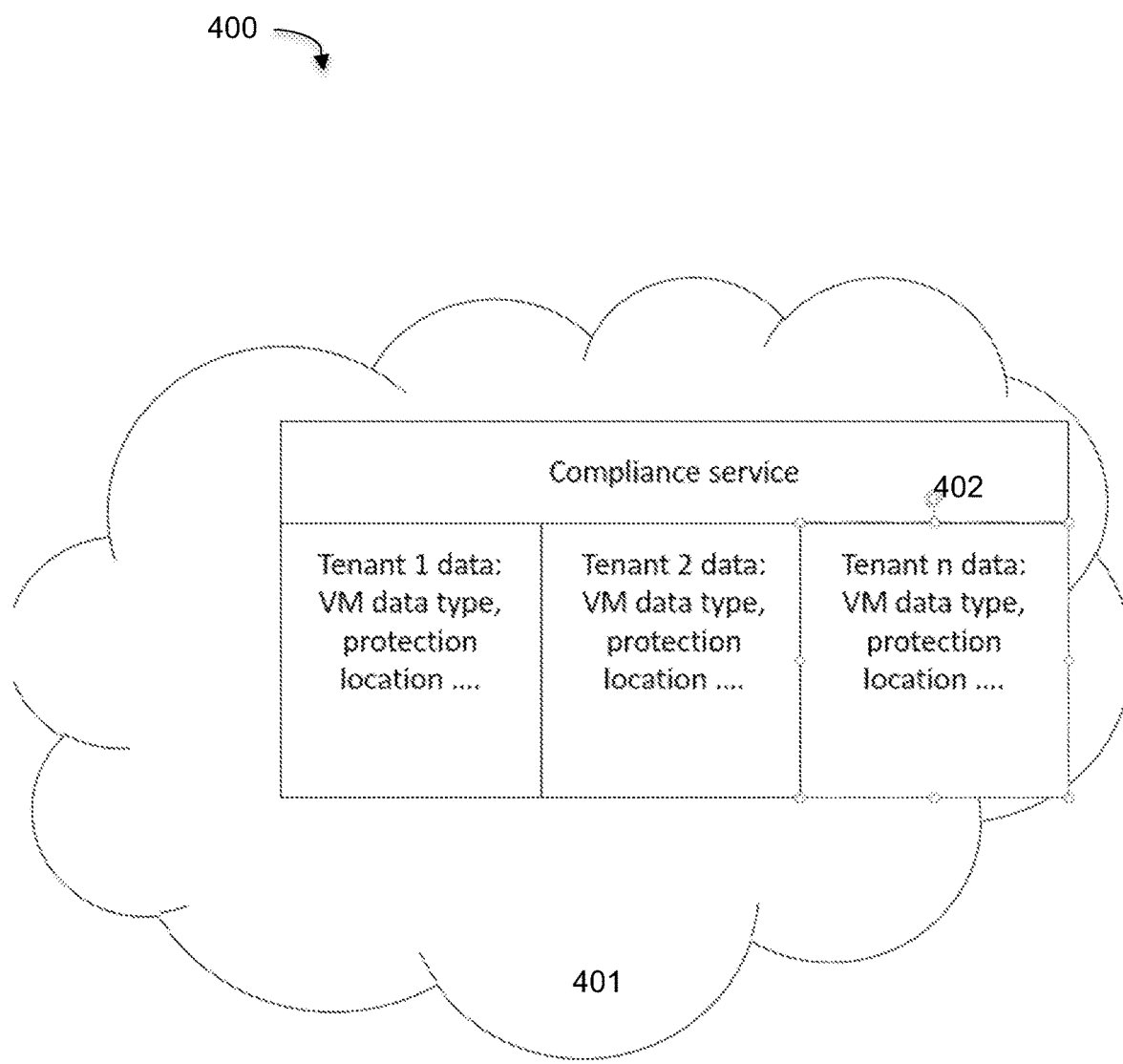
FIG. 4 illustrates the storage of protection policies in a compliance service under some embodiments.

FIG. 4 illustrates the storage of protection policies in a compliance service under some embodiments. Diagram 400 of FIG. 4 shows how the compliance service stores information about the protection policies of each tenant so that it can generate alerts when compliance policy changes. As shown in diagram 400, the compliance service 402 maintained in cloud 401 stores a database of tenants, denoted Tenant 1, Tenant 2, to Tenant n. Each tenant entry comprises data regarding the data type (where the data may or may not be in a VM), protection characteristics, location, and so on. Any number (n) of tenants may be maintained, and the data may comprise any number of appropriate data elements.

Figure 5A:
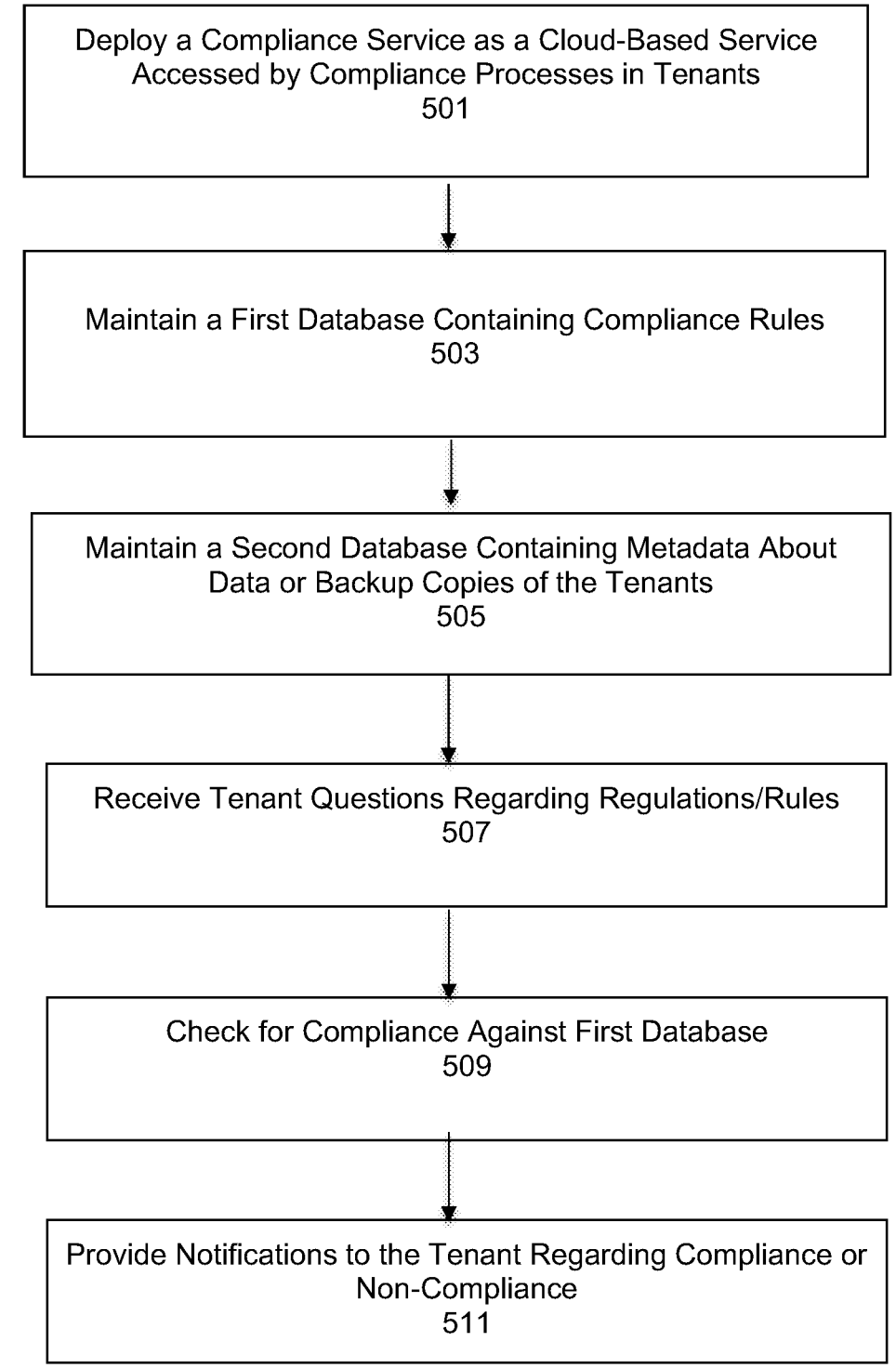
FIG. 5A is a flowchart that illustrates a method of providing compliance as a service under an embodiment.

FIG. 5A is a flowchart that illustrates a method of providing compliance as a service under an embodiment. The process 500 of FIG. 5A begins with the deployment of a compliance service as a cloud-based service accessible to tenants or other host computers through an API (or similar) interface, step 501. The tenants may maintain a corresponding compliance process to access the SaaS compliance process, or an interface may be incorporated in the data processing program executed by the tenant, such as a compliance-enabled DP or data backup program. The compliance service maintains a first database (e.g., DB1 222) that stores the relevant compliance (regulatory and/or policy) rules, step 503. The compliance service also maintains a second database (e.g., DB1 224), that stores metadata about the data or backup copies of the tenants, step 505. Through the appropriate API interface, the compliance service in step 507 receives tenant questions regarding the regulations and rules that may impact the tenant data processing or storage, such as how many copies may be required, data storage restrictions with regard to locations/data types/retention periods, and so on. The compliance process then checks for compliance against the first (rules) database to answer the tenant questions regarding the data characterized in the second database, step 509. The compliance service then provides notifications to the tenant regarding compliance or non-compliance of the data, step 511. The compliance service may be configured to provide binary (yes/no) messages regarding compliance, or it may be configured to provide text messages or suggestions with regard to compliance, or even provide mechanisms that help bring the tenant into compliance.

Figure 5B:
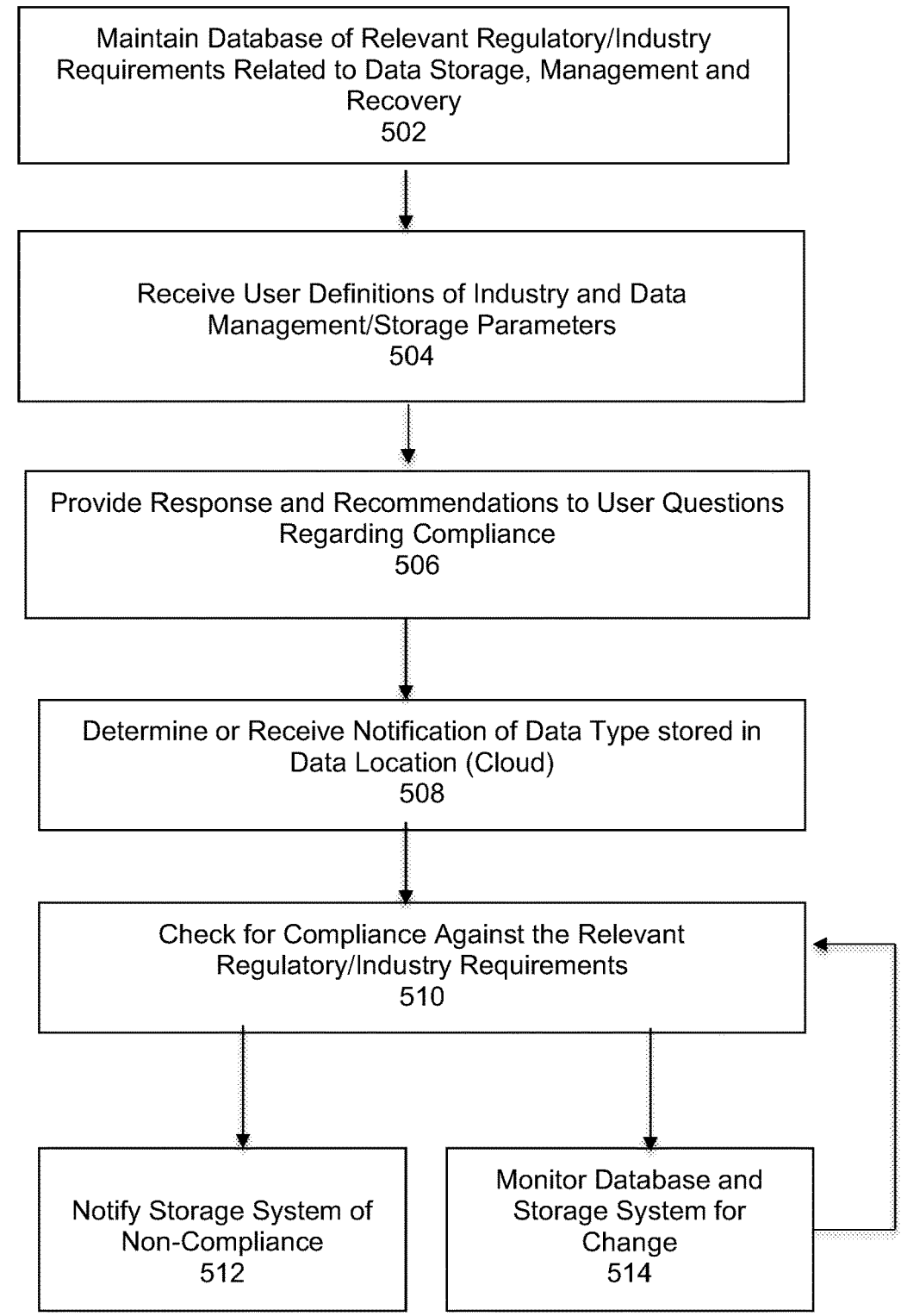
FIG. 5B is a flowchart that illustrates a method of providing compliance as a service under an alternative embodiment.

FIG. 5B is a flowchart that illustrates a method of providing compliance as a service under an alternative embodiment. The process 520 of FIG. 5B begins with the definition and maintenance of a database storing relevant regulatory and industry requirements related to data storage, management and recovery, step 502. Such requirements can be of any appropriate format and may be in the form of rules, restrictions, and so on. Any appropriate database or database format may also be used.

The compliance process then receives user definitions of industry and data management and storage parameters, step 504. Such parameters define the user's needs regarding the storage requirements and policies, as well as their storage systems. User specified policies may be provided by rules, such as an enterprise that requires backups on a particular period (e.g., hourly, daily, weekly, etc.), or that requires the data storage system to meet certain RTO, RPO objectives. The data storage parameters specified by the user include backup programs, platforms, target devices, storage identifiers, and any other relevant information. The needs and policies may be provided to the compliance service through a set of appropriately formatted and transmitted data elements, or they may be provided through a user interface to the compliance service.

Through the user interface, the user may also ask specific questions regarding compliance or request recommendations regarding data storage in light of potential regulations. Thus, in step 506, the compliance services provide responses and recommendations to user questions regarding compliance.

In step 508, the compliance service determines or receives notification from the data protection system of the data type or types stored in a data location, such as in a particular data protection cloud. This determination of the data type may be done by an agent process that checks defined data types in each data location, or it may be made by receiving specific user notifications.

The process 520 then checks for compliance of the data types stored in the storage location against the relevant regulatory/industry requirements, step 510. If the data is non-compliant, the process notifies the storage system of non-compliance. At this point, any user or system-initiated data processing steps (e.g., data replication, recovery, move, cloning, etc.) may be blocked. Alternatively, messages may be sent to require the system or user to select a different source or target destination for the desired data processing operation. In the case where the data is compliant, any attempted operation is allowed, and the process continues to monitor the requirements database and storage system for any change that may affect compliance in the future, step 512. The process then periodically re-checks for compliance, step 510, on a periodic basis that may be set by the user or automatically defined by the compliance process.

Embodiments address and help solve current problems of regulation compliance in multi-cloud backup systems. Namely it addresses the issue of too many cloud offerings wherein data protection systems which backup to clouds can usually integrate with any object storage system, and it is hard to know whether the placement of a specific data in a specific cloud is allowed by regulation. That is, the user does not necessarily know the location of the cloud provider, and if the provider automatically replicates data to different site, this may cause a violation to policy. It also addresses the issues of changing cloud environments where a movement of a data center or a change in a rule may require data movement; complex regulations where users have hard time knowing the latest regulations, common practices and industry requirements in their field regarding data retention, protection, and security; and frequently changing regulations, where the user must verify the compliance and verify that the changes in regulation do not require changes to their data protection policy.

Embodiments of a compliance service seek to enable users to be compliant with all regulatory, industry processes and business needs at all times. The service is available to storage/DP/DM systems through a set of APIs that will enable such compliance to be achieved and maintained with no user intervention and without labor-intensive manual work. The service will also allow storing the configuration of the data protection policies and create alerts when compliance changes. A data backup platform may include a data protection system that integrates with such a service and provides full regulatory/industry compliance.

Embodiments are described in which user questions are received to prompt the system for conformance checks. In an alternative embodiment, an automated or automatic conformance check can be performed using appropriate data recognition tools. In such an embodiment, the regulatory status of the data is checked automatically as part of a conformance check that is provided and performed by the compliance service against the data stored and/or processed by the backup server. The data is first automatically recognized as being data eligible or required to conform to certain regulations, and then the conformance check is performed. For example, medical data may be recognized based on certain data elements or formatting conventions, and such data would be automatically recognized and subject to HIPAA conformance in the United States.

Although embodiments, such as shown in FIG. 2, show application of the compliance service in the context of large-scale data centers distributed around the world, embodiments are not so limited. Any appropriate scale of intra- and inter-networked computers may be used, such as data centers within a state or region, municipality, or organization (e.g., corporation, school, University, hospital, etc.).

System Implementation

Figure 6:
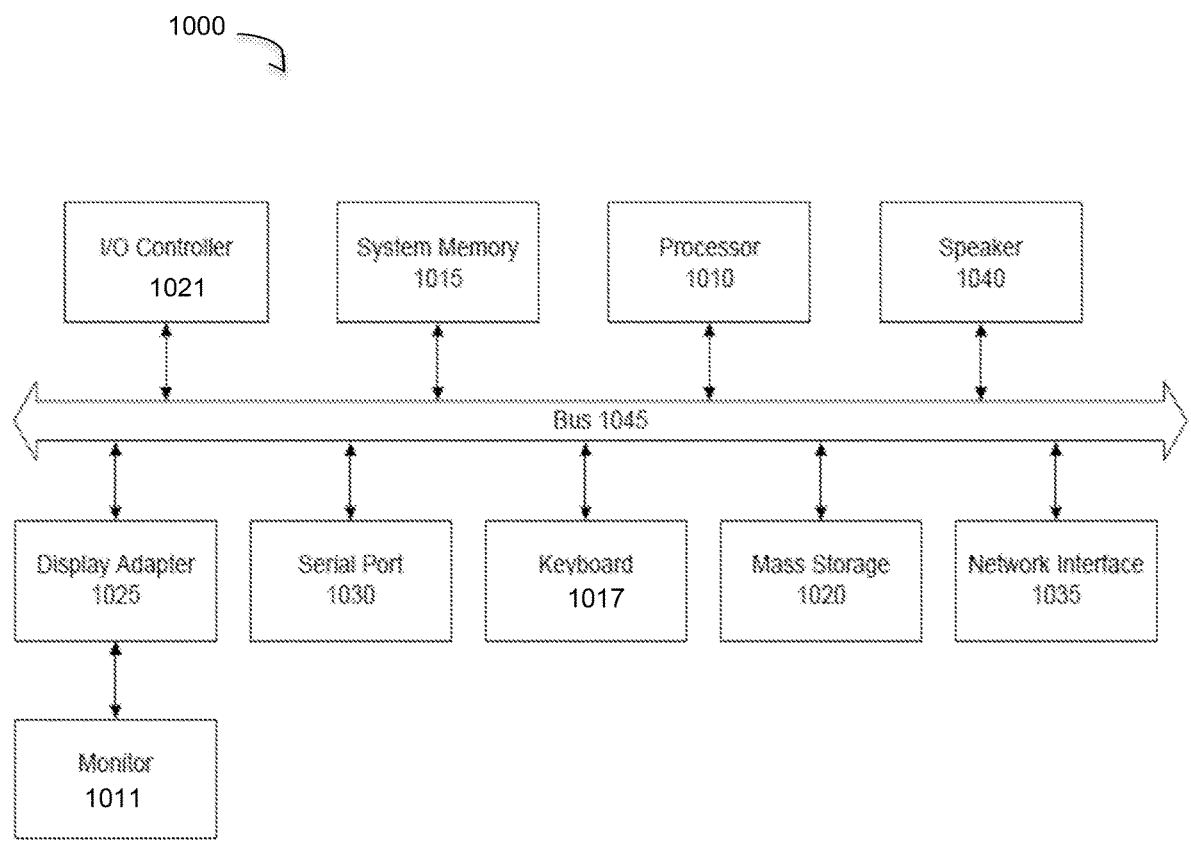
FIG. 6 is a block diagram of a computer system used to execute one or more software components of a cloud-based compliance service for backup applications, under some embodiments.

As described above, in an embodiment, system 100 includes a compliance process 111 that interfaces to a cloud-based compliance service 120. Either or both processes may each be implemented as a server-side process or an executable module executed by the one or more computers in the network, or as a hardware component or circuit provided in the system. FIG. 6 is a block diagram of a computer system used to execute one or more software components of a compliance process and/or service, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
    deploying a compliance service accessible to other host computers in a distributed network environment through a payment-based subscription model to provide regulatory compliance as a service for cloud-based tenants in a multi-tenant system;
    receiving from each subscriber, parameters about the compliance service including information about their industry, and data types;
    maintaining a first database storing relevant compliance rules dictating storage or processing of data in the host computers, and in accordance with the subscriber parameters;
    maintaining a second database storing metadata about the data processed or stored in the host computers;
    receiving storage requirements and policies and operation information for a backup operation executed by a backup server, from at least the second database specifying backup requirement parameters including backup periods, backup targets, storage identifiers, and backup service objectives;
    determining a protection type for data of the backup operation based on the storage media and operation information for the dataset;
    applying compliance rules specific to a subscriber's specific industry that impact the processing or storage of the data by the host computer and as characterized in the second database;
    updating the compliance service upon initiation of the backup operation;
    checking for compliance against the first database based on the protection type, the storage media, and the applied compliance rules;
    monitoring the first and second databases for any change;
    periodically re-checking, upon a user or system defined schedule, compliance of the backup operation with the compliance rules; and
    notifying the host computer regarding compliance or non-compliance of the data, and in the event of non-compliance, blocking the backup operation, otherwise allowing the backup operation in the multi-tenant system so as to meet the backup service objectives, wherein the compliance rules comprise rules selected from at least one of: data location restrictions, data retention periods, and required number of copies.

2. The method of claim 1 wherein the data comprises a plurality of data types, and further wherein the data location restrictions vary for different data types, and the data retention periods dictate a minimum data retention or a maximum data retention period based on a data type, and wherein the backup operation transfers data from one or more data sources to backup targets implemented as Virtual Machine (VM) storage in the distributed network environment.

3. The method of claim 1 wherein the metadata stored in the second database comprises information regarding the data selected from at least one of: data identifier, data type, data location, creation date/time, modification data/time, access privileges, and owner, and further wherein the backup service objectives comprise at least one of a Recovery Point Objective (RPO) and a Recovery Time Objective (RTO).

4. The method of claim 1 wherein the distributed network environment comprises a network of distributed data centers and the compliance service is deployed as a cloud-based service.

5. The method of claim 4 wherein the network comprises a multi-tenant system and the host computers comprise respective tenants in the multi-tenant system, and further wherein, each tenant maintains a corresponding compliance process to access the compliance service through an application program interface (API).

6. The method of claim 5 wherein the API interface comprises a first API that provides an interface allowing a user of the host computer user to ask a compliance question in plain text regarding applicable regulatory requirements, and a second API providing a notification in the notifying step in the form of a text message regarding compliance or non-compliance.

7. The method of claim 6 wherein the notifying comprises proactively notifying the user in the event of at least one of: a change in a regulation due to updates or modifications; a change in the data type; and a change in the data location.

8. The method of claim 7 wherein the notification includes a direction instructing the user to perform a data processing act selected from at least one of: delete a copy due to a retention regulation change or violation; create more copies due to a regulation change; or move a copy due to a regulation change.

9. The method of claim 1 wherein the API interface accesses the compliance service through a JavaScript Object Notation (JSON) format.

10. The method of claim 1 wherein the compliance rules comprise regulatory or policy rules established and enforced by at least one of: a regulatory body, a government, a user group, or a data provider.

11. A method of maintaining regulatory compliance of data stored in a multi-cloud storage environment, comprising:
    providing regulatory compliance as a service through a payment-based subscription model for cloud-based tenants in a multi-tenant system of the multi-cloud storage environment;
    maintaining a database of relevant regulatory and industry requirements related to data storage, management and recovery;
    receiving user definitions of industry and data management and storage parameters;
    receiving storage requirements and policies and operation information for a backup operation executed by a backup server from a database specifying backup requirement parameters including backup periods, backup targets, storage identifiers, and backup service objectives;
    determining a protection type for data of the backup operation based on the storage media and operation information for the dataset;
    applying compliance rules for regulatory requirements for specific types of data specific to the user defined industry and the data management and storage parameters;
    updating the compliance service upon initiation of the backup operation;

checking for compliance of the stored data against the relevant regulatory and industry requirements based on the protection type, the storage media, and the applied compliance rules, and if non-compliant, notifying the storage system of non-compliance and blocking the backup operation, and if compliant, monitoring the database and storage system for changes in at least one of the requirements and the data types and allowing the backup operation in the multi-tenant system so as to meet the backup service objectives; and monitoring the data, backup operation, and compliance rules for any change;

periodically re-checking, upon a user or system defined schedule, compliance of the backup operation with the compliance rules, wherein the regulatory and industry requirements comprise rules dictating security, access, storage period, and minimum data integrity of the stored data, and wherein the data management and storage parameters comprise: storage devices, device manufacturer, device model, device type, data retention policies, and risk tolerance.

12. The method of claim 11 further comprising integrating a compliance service process maintaining the regulatory compliance with a backup system storing data in one or more storage devices, and wherein the backup service objectives comprise at least one of a Recovery Point Objective (RPO) and a Recovery Time Objective (RTO).

13. The method of claim 12 further comprising deploying the compliance service process as a server-side process in a first cloud to monitor and validate data transfers between applications residing in other clouds that may reside in respective other countries.

14. The method of claim 13 wherein the data transfers comprise a data migration from a location controlled by an application from a second cloud to a data storage location in a third cloud, and wherein the backup operation transfers data from one or more data sources to backup targets implemented as Virtual Machine (VM) storage in the distributed network environment.

15. The method of claim 13 wherein the compliance service process is integrated with the backup system through one or more application program interfaces (APIs).

16. A system comprising:

a first cloud-computing platform comprising a compliance service accessible to other host computers in a distributed network environment through a payment-based subscription model to provide regulatory compliance as a service for cloud-based tenants in a multi-tenant system, and receiving from each subscriber parameters about the compliance service including information about their industry, and data types;

a first database accessible to the compliance service and storing relevant compliance rules dictating storage or processing of data in the host computers, and in accordance with the subscriber parameters;

a second database accessible to the compliance service and storing metadata about the data processed or stored in the host computers;

a first API-based interface receiving storage requirements and policies and operation information for a backup operation executed by a backup server, from at least the second database specifying backup requirement parameters including backup periods, backup targets, storage identifiers, and backup service objectives, determining a protection type for data of the backup operation based on the storage media and operation information for the dataset, applying compliance rules specific to a subscriber's specific industry that impact the processing or storage of the data by the host computer and as characterized in the second database, updating the compliance service upon initiation of the backup operation, and checking for compliance against the first database based on the protection type, the storage media, and the applied compliance rules;

a monitor monitoring the first and second databases for any change, and periodically re-checking, upon a user or system defined schedule, compliance of the backup operation with the compliance rules; and a second API-based interface notifying the host computer regarding compliance or non-compliance of the data, and in the event of non-compliance, blocking the backup operation, otherwise allowing the backup operation in the multi-tenant system so as to meet the backup service objectives, wherein the compliance rules comprise rules selected from at least one of: data location restrictions, data retention periods, and required number of copies, and wherein the data comprises a plurality of data types, and further wherein the data location restrictions vary for different data types, and the data retention periods dictate a minimum data retention or a maximum data retention period based on a data type, and yet further wherein the metadata stored in the second database comprises information regarding the data selected from at least one of: data identifier, data type, data location, creation date/time, modification data/time, access privileges, and owner, and further wherein the backup service objectives comprise at least one of a Recovery Point Objective (RPO) and a Recovery Time Objective (RTO).

17. The method of claim 16 wherein the distributed network environment comprises a network of distributed data centers and the compliance service is deployed as a cloud-based service, and wherein the host computer is deployed in a second cloud-computing platform in a multi-tenant system in which the host computers comprise respective tenants, and further wherein, each tenant maintains a corresponding compliance process to access the compliance service through and application program interface (API), and further wherein the backup operation transfers data from one or more data sources to backup targets implemented as Virtual Machine (VM) storage in the distributed network environment.

* * * * *